(12) United States Patent
Jiang (10) Patent No.: US 11,025,550 B2
(45) Date of Patent: Jun. 1, 2021

(54) METHOD, DEVICE AND COMPUTER READABLE STORAGE MEDIUM FOR TRANSMITTING INFORMATION

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 67 days.

(21) Appl. No.: 16/584,473

(22) Filed: Sep. 26, 2019

(65) Prior Publication Data

US 2020/0021530 A1  Jan. 16, 2020

Related U.S. Application Data (63) Continuation of application No. PCT/CN2017/087203, filed on Jun. 5, 2017, which is
(Continued)

(51) Int. Cl.
*H04L 12/851* (2013.01)
*H04L 29/06* (2006.01)
(Continued)

(52) U.S. Cl.
CPC ...... *H04L 47/2483* (2013.01); *H04L 47/2441* (2013.01); *H04L 69/22* (2013.01); *H04W 28/24* (2013.01); *H04W 28/0268* (2013.01)

(58) Field of Classification Search
CPC . H04L 47/2483; H04L 47/2441; H04L 69/22; H04W 28/24; H04W 28/0967
See application file for complete search history.

(56) References Cited

U.S. PATENT DOCUMENTS

2015/0257159 A1   9/2015 Speicher et al.
2018/0279160 A1*  9/2018 Sayenko .......... H04W 72/0406
(Continued)

FOREIGN PATENT DOCUMENTS

CN   101179421 A   5/2008
CN   101848056 A   9/2010
(Continued)

OTHER PUBLICATIONS

First Office Action of Chinese Application No. 201780000408.0 dated May 21, 2020 with English translation (18p).
(Continued)

*Primary Examiner* — Candal Elpenord
(74) *Attorney, Agent, or Firm* — Arch & Lake LLP (57) ABSTRACT

A method and device for transmitting information are provided. The method includes: querying a corresponding second QoS flow identifier and a length of the second QoS flow identifier from stored configuration information in accordance with a first QoS flow identifier of data to be transmitted, where the configuration information includes a configuration list corresponding to a data bearer, the configuration list is configured to store a correspondence relationship among the first QoS flow identifier, the second QoS flow identifier and the length of the second QoS flow identifier, and the length of the second QoS flow identifier is smaller than a length of the first QoS flow identifier; and adding the second QoS flow identifier into a packet header of the data and implementing information transmission based on data obtained after addition when the second QoS flow identifier and the length of the second QoS flow identifier are queried.

20 Claims, 4 Drawing Sheets

Related U.S. Application Data a continuation of application No. PCT/CN2017/082241, filed on Apr. 27, 2017.

(51) Int. Cl.
*H04W 28/24* (2009.01)
*H04W 28/02* (2009.01)

(56) References Cited

U.S. PATENT DOCUMENTS

| | | | | |
|---|---|---|---|---|
| 2018/0317120 A1* | 11/2018 | Wang | | H04W 28/0263 |
| 2019/0349803 A1* | 11/2019 | Byun | | H04W 28/16 |
| 2019/0357093 A1* | 11/2019 | Xu | | H04W 36/08 |
| 2020/0015116 A1* | 1/2020 | Huang | | H04W 28/02 |
| 2020/0037197 A1* | 1/2020 | Cho | | H04W 80/08 |
| 2020/0100133 A1* | 3/2020 | Tang | | H04W 28/0268 |
| 2020/0128430 A1* | 4/2020 | Yi | | H04W 28/0268 |
| 2020/0213894 A1* | 7/2020 | Agiwal | | H04W 76/15 |

FOREIGN PATENT DOCUMENTS

| | | |
|---|---|---|
| CN | 103188146 A | 7/2013 |
| CN | 103581130 A | 2/2014 |
| CN | 104301251 A | 1/2015 |
| CN | 104902518 A | 9/2015 |
| WO | 2013097654 A1 | 7/2013 |
| WO | 2017001634 A1 | 1/2017 |

OTHER PUBLICATIONS

Huawei, et al, "Use of Shorter QoS Floe ID" 3GPP TSG-RAN2 Meeting #97bis, R2-1702616, Mar. 25, 2017, Section 2.2, (2p).
International Search Report of PCT Application No. PCT/CN2017/087203 dated Jan. 25, 2018, with English translation, (17p).

* cited by examiner

METHOD, DEVICE AND COMPUTER READABLE STORAGE MEDIUM FOR TRANSMITTING INFORMATION

CROSS-REFERENCE TO RELATED APPLICATION

This application is a continuation application of International Application No. PCT/CN2017/087203, filed on Jun. 5, 2017, which claims priority to International Application No. PCT/CN2017/082241, filed on Apr. 27, 2017, the entire contents of which are incorporated herein by reference.

TECHNICAL FIELD

The present disclosure relates to the field of communication technology, and in particular to a method, device, and computer readable storage medium for information transmission.

BACKGROUND

With the rapid development of communication technology, 5G (Fifth Generation) systems have emerged. A 5G system mainly includes an AS (Access Stratum) and an NAS (Non-access Stratum). At present, a new stratum, which is generally referred to as an SDAP (Service Data Adaptation Protocol) stratum nowadays, is introduced into the AS of the 5G system. The SDAP stratum can be configured to perform mapping between a QoS (Quality of Service) flow and a data bearer, and add different QoS flow identifiers into a packet header of transmission data for different QoS flows to identify the QoS flow of the transmission data.

Different QoS flows are obtained after mapping is performed on an IP (Internet Protocol) flow based on different QoS parameters. In a service transmission process, a service may include multiple QoS flows, and different QoS flows may be mapped to different data bearers. In order to successfully implement data transmission, whether it is uplink data or downlink data, it is generally needed to add a corresponding QoS flow identifier in the packet header in accordance with the QoS flow of the data to be transmitted through the SDAP stratum, and transmit the QoS flow identifier. For example, in order for a wireless access device (for example, a base station), when receiving data, to be able to determine which transmission channel to be selected from a plurality of transmission channels between the wireless access device and a core network to transmit the data, UE (User Equipment) needs to add a corresponding QoS flow identifier into the data to be transmitted in accordance with the QoS flow of the data, to transmit the QoS flow identifier to the wireless access device.

SUMMARY

The aspects of the present disclosure provide a method, device, and a computer readable storage medium for transmitting information.

In a first aspect, there is provided a method for transmitting information, comprising:

querying a corresponding second QoS (Quality of Service) flow identifier and a length of the second QoS flow identifier from stored configuration information in accordance with a first QoS flow identifier of data to be transmitted, the configuration information comprising a configuration list corresponding to a data bearer, the configuration list being configured to store a correspondence relationship among the first QoS flow identifier, the second QoS flow identifier and the length of the second QoS flow identifier, wherein the length of the second QoS flow identifier is smaller than a length of the first QoS flow identifier; and adding the second QoS flow identifier into a packet header of the data and implementing information transmission based on data obtained after addition when the second QoS flow identifier and the length of the second QoS flow identifier are queried.

In a second aspect, there is provided a device for transmitting information, comprising: a processor; and a memory configured to store instructions executable by the processor. The processor is configured to: query a corresponding second QoS flow identifier and a length of the second QoS flow identifier from stored configuration information in accordance with a first QoS flow identifier of data to be transmitted, the configuration information comprising a configuration list corresponding to a data bearer, the configuration list being configured to store a correspondence relationship among the first QoS flow identifier, the second QoS flow identifier and the length of the second QoS flow identifier, wherein the length of the second QoS flow identifier is smaller than a length of the first QoS flow identifier; and add the second QoS flow identifier into a packet header of the data and implement information transmission based on data obtained after addition when the second QoS flow identifier and the length of the second QoS flow identifier are queried.

In a third aspect, there is provided a non-transitory computer readable storage medium for transmitting information, comprising instructions stored therein, wherein, when the instructions are executed by a processor, the instructions cause the processor to implement acts including: querying a corresponding second QoS flow identifier and a length of the second QoS flow identifier from stored configuration information in accordance with a first QoS flow identifier of data to be transmitted, the configuration information comprising a configuration list corresponding to a data bearer, the configuration list being configured to store a correspondence relationship among the first QoS flow identifier, the second QoS flow identifier and the length of the second QoS flow identifier; wherein the length of the second QoS flow identifier is smaller than a length of the first QoS flow identifier; and adding the second QoS flow identifier into a packet header of the data and implementing information transmission based on data obtained after addition when the second QoS flow identifier and the length of the second QoS flow identifier are queried.

BRIEF DESCRIPTION OF THE DRAWINGS

The accompanying drawings, which are incorporated in and constitute part of the description, illustrate aspects consistent with the present disclosure and, together with the description, serve to explain the principles of the present disclosure.

DETAILED DESCRIPTION

Reference is made in detail to the aspects, examples of which are illustrated in the accompanying drawings. The following description refers to the accompanying drawings in which the same numbers in different drawings represent the same or similar elements unless otherwise represented. The implementations set forth in the following description of the aspects do not represent all implementations consistent with the present disclosure. Instead, they are merely examples of devices and methods consistent with aspects related to the disclosure.

The terminology used herein is for the purpose of describing particular examples only and is not intended to be limiting of examples. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components and/or groups thereof.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context. It should also be understood that the term "and/or" as used herein refers to and includes any and all possible combinations of one or more of the associated listed items.

Before detailed description of the aspects of the present disclosure, terms involved in the aspects of the present disclosure are briefly introduced below.

PDU (Protocol Data Unit) session: one PDU session corresponds to a service. In a 5G system, each PDU session corresponds to one SDAP logic entity. One PDU session includes a plurality of QoS flows, and different QoS flows may be mapped onto different data bearers. In general, the QoS flows of different PDU sessions cannot be mapped onto the same data bearer. It should be noted that for the convenience of description, in the aspects of the present disclosure, the PDU session is generally described in the form of service.

QoS flow: different QoS flows are obtained by mapping an IP flow based on different QoS. In a data transmission process, UE or a wireless access device may map different IP flows into different QoS flows based on actual demands. Besides, different data bearers need to be adopted to transmit different QoS flows, that is, different QoS flows generally need to be mapped onto different data bearers. It should be explained here that in a possible implementation, several different QoS flows may be mapped onto the same data bearer, that is, the same data bearer may also transmit a plurality of different QoS flows.

Hereinafter, application scenarios involved in the aspects of the present disclosure will be introduced.

Figure 1A:
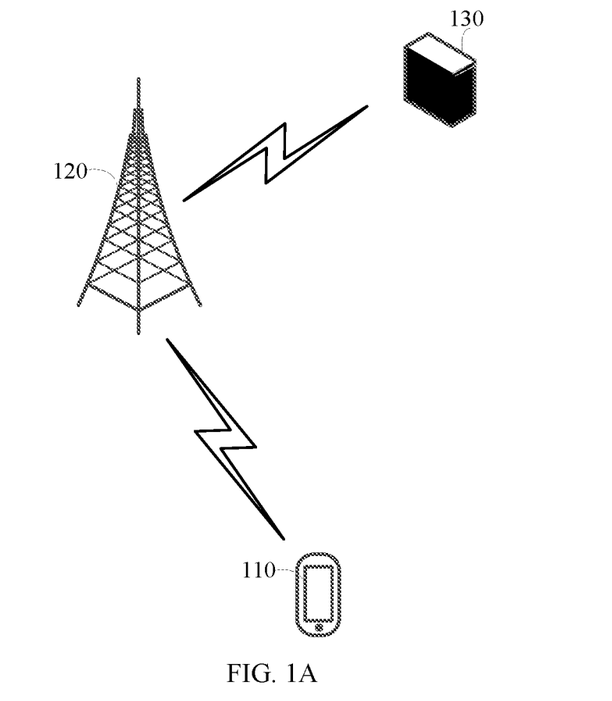
FIG. 1A is a schematic diagram showing an implementation environment according to some aspects.

Referring to FIG. 1A, FIG. 1A is a schematic diagram showing an application scenario according to some aspects. The application scenario mainly includes UE 110 and a wireless access device 120. The UE 110 may be connected to the wireless access device 120 via a mobile communication network.

The wireless access device 120 is mainly configured to transmit configuration information to the UE 110, such that the UE can determine how to implement data transmission and how to implement information transmission during data transmission in accordance with the configuration information. The wireless access device 120 may be a device, such as a base station, which is not limited in the aspects of the present disclosure.

The UE 110 is mainly configured to receive the configuration information transmitted by the wireless access device 120 and determine how to implement data transmission and how to implement information transmission during data transmission in accordance with the configuration information.

Figure 3:
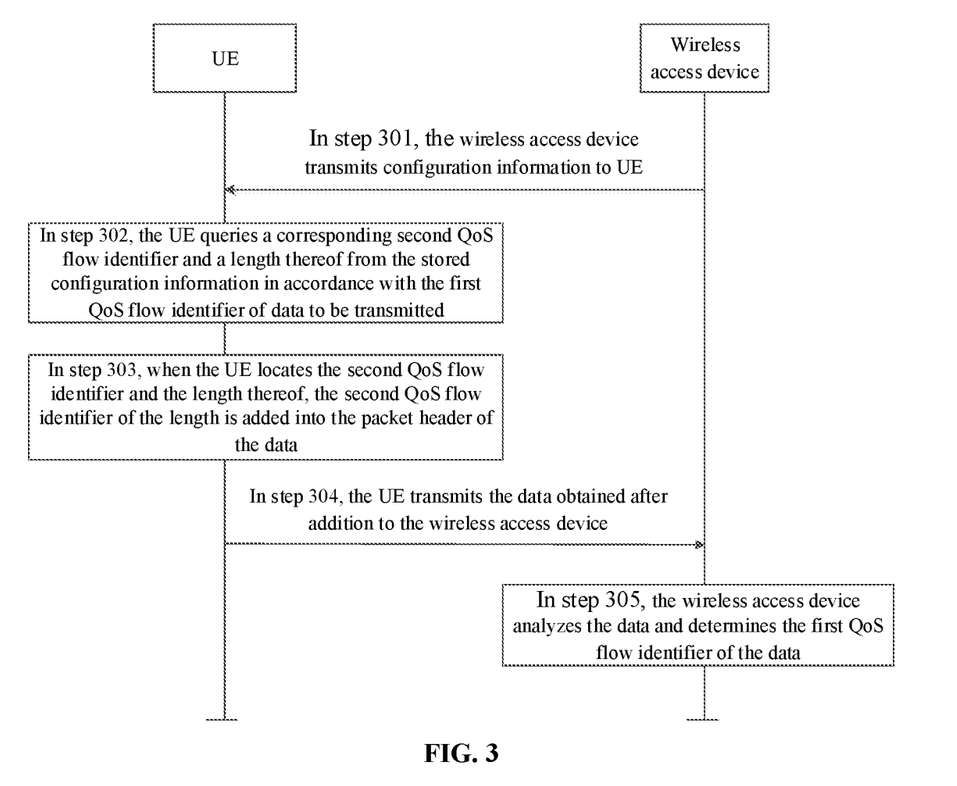
FIG. 3 is a flow chart showing an information transmission method according to some aspects.

It should be noted that for the processes of implementing information transmission and data transmission between the UE 110 and the wireless access device 120, please refer to the following aspects shown in FIG. 3.

Further, the wireless access device 120 also needs to transmit data to the UE 110. The wireless access device 120 may also determine how to implement data transmission and how to implement information transmission during data transmission in accordance with the self-configured configuration information. The implementation processes are the same as those of the UE 110.

Further, the application scenario may further include a core network device 130, which may also be connected to the wireless access device 120 via a mobile communication network. In addition, between the core network device 130 and the wireless access device, there may be one or a plurality of transmission channels for data transmission. That is, the wireless access device 120 may, after receiving the data transmitted by the UE 110, transmit the data to the core network device at the upper stratum via one transmission channel or a certain transmission channel in the plurality of transmission channels, such that the data is further transmitted.

Figure 1B:
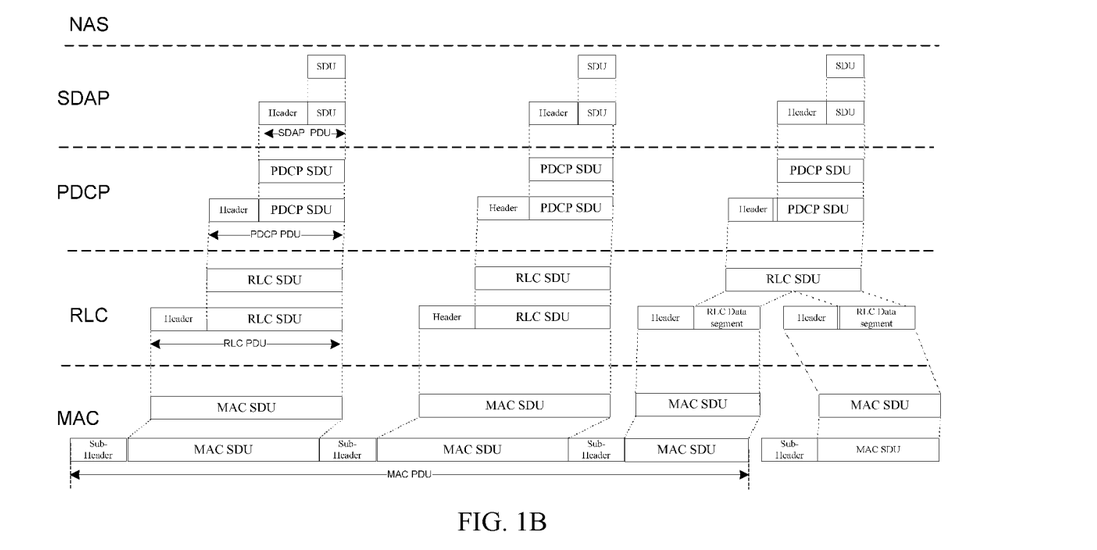
FIG. 1B is a schematic diagram showing a hierarchical structure of a 5G system according to some aspects.

For the convenience of understanding, the inter-stratum relationship of the 5G system is briefly introduced below. Referring to FIG. 1B, FIG. 1B is a schematic diagram showing a hierarchical structure of a 5G system according to some aspects. The 5G system mainly includes an AS and an NAS. The newly-introduced SDAP stratum belongs to the AS; and the upper stratum of the SDAP is the NAS.

In the 5G system, both of the UE 110 and the wireless access device 120 include the above structures. Taking the UE 110 as an example, in the process of data transmission, data is transmitted by the NAS to the SDAP stratum. The NAS indicates information of a QoS flow of the data. For example, the information may be a first QoS flow identifier or the like. Afterwards, the SDAP stratum adds the first QoS flow identifier or a second QoS flow identifier into a packet header of the data based on the QoS flow. The data added with the information by the SDAP stratum is transmitted to a PDCP (Packet Data Convergence Protocol) stratum, and then is processed by an RLC (Radio Link Control) stratum and an MAC (Media Access Control) stratum, and is finally transmitted to the wireless access device via a data bearer.

In a data receiving process, when the UE 110 receives the data, the data is processed by the MAC stratum, the RLC stratum and the PDCP stratum and then is transmitted to the SDAP stratum. After the packet header of the data is removed by the SDAP stratum, the data is transmitted to the upper stratum of the SDAP stratum, namely, the NAS.

It should be noted that in the above process of data processing, for each stratum, the received data transmitted last time may be called an SDU (Service Data Unit), and the data processed by the stratum may be called a PDU. That is, the SDU and the PDU are two relative concepts. For example, for the SDAP stratum, the data received from the PDCP may be called SDAP SDU, and the data transmitted to the NAS after being processed may be called SDAP PDU.

Figure 2:
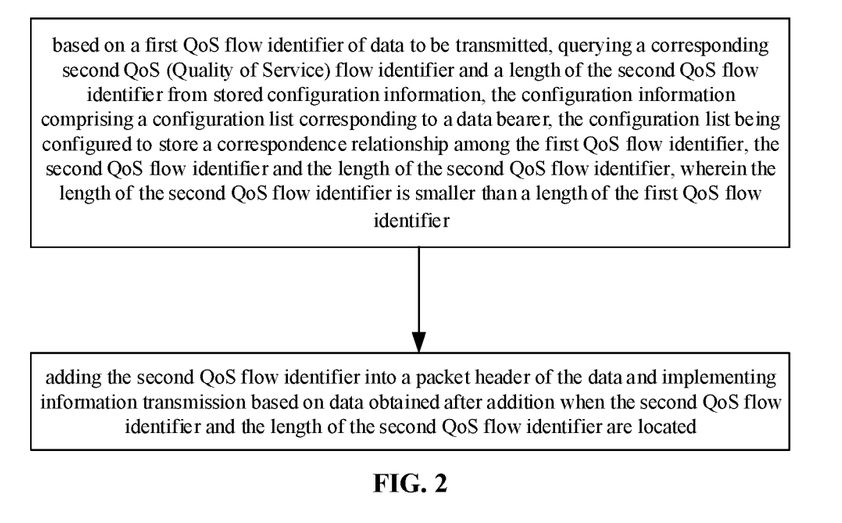
FIG. 2 is a flow chart showing an information transmission method according to some aspects.

FIG. 2 is a flow chart showing an information transmission method according to some aspects. The information transmission method may include the following steps.

In step 201, a corresponding second QoS flow identifier and a length thereof are queried from stored configuration information in accordance with a first QoS flow identifier of data to be transmitted. The configuration information includes a configuration list corresponding to a data bearer. The configuration list is configured to store a correspondence relationship among the first QoS flow identifier, the second QoS flow identifier and the length of the second QoS flow identifier. The length of the second QoS flow identifier is smaller than that of the first QoS flow identifier.

In step 202, when the second QoS flow identifier and the length thereof are queried, the second QoS flow identifier of the length is added into the packet header of the data and information transmission is implemented based on the data obtained after addition.

In some aspects of the present disclosure, during data transmission, the corresponding second QoS flow identifier and the length thereof are queried from the stored configuration information in accordance with the first QoS flow identifier of the data to be transmitted. When the second QoS flow identifier and the length thereof are queried, it indicates that the second QoS flow identifier can replace the first QoS flow identifier. Thus, the second QoS flow identifier of the length is added into the packet header of the data. Since the length of the second QoS flow identifier is smaller than that of the first QoS flow identifier, the overhead can be reduced when information transmission is implemented based on the data added with the second QoS flow identifier. Besides, the configuration information further indicates the length of the second QoS flow identifier. Thus, the flexibility in configuring the second QoS flow identifier is improved. Therefore, the flexibility of information transmission is improved.

Optionally, the configuration information further includes first indication information for indicating a specified QoS flow that needs no transmission of the first QoS flow identifier and/or the second QoS flow identifier. The specified QoS flow includes a specified uplink QoS flow and/or a specified downlink QoS flow.

Optionally, the packet header of the data further includes second indication information for indicating whether the packet header of the data includes the first QoS flow identifier or the second QoS flow identifier.

Optionally, the packet header of the data further includes third indication information for indicating a length of the content of a specified field in the packet header of the data. The specified field is configured to carry the first QoS flow identifier or the second QoS flow identifier.

Optionally, when the packet header of the data includes the second QoS flow identifier, the packet header of the data further includes fourth indication information. The fourth indication information is configured to indicate the length of the second QoS flow identifier.

Optionally, before querying the corresponding second QoS flow identifier and the length thereof from the stored configuration information in accordance with the first QoS flow identifier of the data to be transmitted, the information transmission method further includes: receiving and storing the configuration information transmitted by the wireless access device.

All of the above optional variations may form optional aspects of the present disclosure in arbitrary combinations, and detailed description thereof will not be presented herein.

FIG. 3 is a flow chart showing an information transmission method according to some other aspects. Here, implementing the information transmission method by multilateral interaction is taken as an example for illustration. The information transmission method may include the following implementation steps.

In step 301, a wireless access device transmits configuration information to UE, and the UE receives the configuration information transmitted by the wireless access device.

In practice, for uplink data, the UE generally needs to add a QoS flow identifier into the transmitted data, such that the wireless access device, when receiving the data, can determine a transmission channel via which the data is to be transmitted to an upper stratum. As described above, the transmission channel refers to a transmission channel between the wireless access device and the core network device. For example, the transmission channel may be a CN (Core Network) QoS transmission channel.

For the UE to conveniently determine, during data transmission, which QoS flow identifier to be added based on the QoS flow of data to be transmitted, the wireless access device can transmit the configuration information to the UE in advance to instruct the UE how to add the QoS flow identifiers for different QoS flows by the configuration information. During specific implementation, the wireless access device may carry the configuration information via an RRC (Radio Resource Control) reconfiguration message.

The above illustration is presented here only by taking an example in which the wireless access device carries the configuration information via the RRC reconfiguration message. In some other aspects, the wireless access device may carry the configuration information via other messages, which is not limited in the aspects of the present disclosure.

The configuration information includes a configuration list corresponding to a data bearer. The configuration list is configured to store a correspondence relationship among the first QoS flow identifier, the second QoS flow identifier and the length of the second QoS flow identifier. The length of the second QoS flow identifier is smaller than that of the first QoS flow identifier.

It should be noted that during actual implementation, the configuration information may include a configuration list corresponding to one data bearer and may also include configuration lists corresponding to a plurality of data bearers, which is not limited in the aspects of the present disclosure.

The data bearer may be a DRB (Data Radio Bearer).

The first QoS flow identifier may be configured to uniquely identify one QoS flow. For example, the first QoS flow identifier may be called a QoS flow ID. Compared with the second QoS flow identifier, the first QoS flow identifier may be a complete identifier of the QoS flow. In general, to guarantee the uniqueness of each PDU session of each UE, the first QoS flow identifier may be represented by a value of 8 bits or more than 8 bits.

The second QoS flow identifier may also be configured to uniquely identify one QoS flow. The second QoS flow identifier and the first QoS flow identifier are in one-to-one correspondence. Different from the first QoS flow identifier, the second QoS flow identifier has a length smaller than that of the first QoS flow identifier. For example, the second QoS flow identifier may be data of 2 bits. Further, the data may be a serial number of 2 bits. For example, the serial number of 2 bits may be "10", etc.

In fact, it can be deemed that the second QoS flow identifier is another representation of the corresponding first QoS flow identifier. That is, in some aspects of the present disclosure, the second QoS flow identifier and the corresponding first QoS flow identifier are configured to identify one QoS flow (a same QoS flow).

Since the first QoS flow identifier is represented by a relatively longer bit number, a high overhead is caused. Thus, in some aspects of the present disclosure, the second QoS flow identifier with a relatively shorter length may be adopted to replace the first QoS flow identifier to reduce the overhead.

During actual implementation, if the length of the second QoS flow identifier is fixed, when there are more QoS flows, it easily leads to a failure of representation with the second QoS flow identifier. In this case, the second QoS flow identifier on the data bearer may need to be reconfigured. Thus, if the data with the previously configured length has not been completely transmitted, the packet header of the data transmitted on the data bearer may include the second QoS flow identifiers with various lengths.

Alternatively, some newly added QoS flows exist on a certain data bearer, and the wireless access device has not been configured with the corresponding second QoS flow identifier. In this case, the only way is to add the first QoS flow identifier to the transmission data first and replace the first QoS flow identifier with the corresponding second QoS flow identifier after the corresponding QoS flow identifier is configured. However, in this way, the packet header of the data transmitted on the data bearer may include the first QoS flow identifier and may also include the second QoS flow identifier. That is, there may be the case that data including the first QoS flow identifier and data including the second QoS flow identifier coexist.

For the above two cases, during actual implementation, the wireless access device generally indicates the length of the second QoS flow identifier that needs to be transmitted. That is, the correspondence relationship among the first QoS flow identifier, the second QoS flow identifier and the length of the second QoS flow identifier is stored in the configuration list. For example, Table 1 below exemplarily shows a configuration list of a certain data bearer DRB1.

TABLE 1

| DRB1 | First QoS flow identifier | Second QoS flow identifier | Length (bit) |
|---|---|---|---|
|  | QoS flow ID1 | QoS flow short ID1 | 2 |
|  | QoS flow ID2 | QoS flow short ID2 | 2 |
|  | ... | ... | ... |
|  | QoS flow IDn | QoS flow short IDn | 2 |

It should be noted that the foregoing description only takes an example where the configuration list exists in the form of Table 1. In some other aspects, the configuration list of the data bearer may also be in other forms, which is not be limited in the aspects of the present disclosure.

In addition, it should also be noted that during actual implementation, for each UE, the lengths of all the second QoS flow identifiers may be the same. Alternatively, for the data bearer that each UE corresponds to, the lengths of all the second QoS flow identifiers may be the same, which is not be limited in the aspects of the present disclosure.

In step 302, the UE queries a corresponding second QoS flow identifier and a length thereof from the stored configuration information in accordance with the first QoS flow identifier of data to be transmitted.

During actual implementation, when data is to be transmitted, the NAS of the UE transmits the first QoS flow identifier of the data to be transmitted to the SDAP stratum. The SDAP stratum determines a data bearer that the first QoS flow identifier corresponds to and selects a configuration list of the data bearer from the configuration information after receiving the first QoS flow identifier. Then, the SDAP stratum of the UE queries whether the corresponding second QoS flow identifier and the length thereof exist in the selected configuration list.

In step 303, when the UE locates the second QoS flow identifier and the length thereof, the second QoS flow identifier of the length is added into the packet header of the data.

During actual implementation, when the SDAP stratum of the UE locates the second QoS flow identifier and the length thereof, it indicates that the second QoS flow identifier can be used to replace the first QoS flow identifier. That is, the second QoS flow identifier of the length is added into the packet header of the data. Since the length of the second QoS flow identifier is smaller than that of the first QoS flow identifier, the overhead caused by data transmission can be reduced.

It should be noted that illustration is present here only by taking an example where the UE locates the second QoS flow identifier and the length thereof. In some other aspects, if the UE does not locate the second QoS flow identifier or the length thereof, it may indicate that the first QoS flow identifier may be newly added, and the wireless access device has not configured the first QoS flow identifier with the corresponding second QoS flow identifier yet. In this case, the SDAP stratum of the UE may add the first QoS flow identifier into the packet data of the data.

Further, the packet header of the data further includes second indication information for indicating whether the packet header of the data includes the first QoS flow identifier or the second QoS flow identifier.

That is, the second indication information can indicate whether the packet header of the data includes the first QoS flow identifier or the second QoS flow identifier, and if yes, it indicates which one of the first QoS flow identifier and the second QoS flow identifier is included.

Further, for the convenience of accurately and quickly determining the carried QoS flow identifier by the wireless access device of a receiver, the packet header of the transmitted data needs to indicate the length of the QoS flow identifier. The QoS flow identifier may be the first QoS flow identifier or the second QoS flow identifier.

That is, the packet header of the data further includes third indication information for indicating a length of the content of a specified field in the packet header of the data. The specified field is configured to carry the first QoS flow identifier or the second QoS flow identifier.

Further, when the packet header of the data includes the second QoS flow identifier, the packet header of the data further includes fourth indication information. The fourth indication information is configured to indicate the length of the second QoS flow identifier.

During actual implementation, since the UE and the wireless access device generally negotiate the length of the first QoS flow identifier in advance, during data transmission, the packet header of the data may not indicate the length of the first QoS flow identifier. However, when the packet header of the data includes the second QoS flow identifier, since the second QoS flow identifier is flexibly and dynamically configured, the fourth indication information needs to be added into the packet header of the data, to indicate the length of the second QoS flow identifier via the fourth indication information. Thus, the overhead can be reduced.

In step 304, the UE transmits the data obtained after addition to the wireless access device to implement information transmission based on the data obtained after addition.

During actual implementation, the UE transmits the data to the wireless access device via the corresponding data bearer. That is, the second QoS flow identifier is transmitted to the wireless access device via the data.

In step 305, the wireless access device analyzes the data and determines the first QoS flow identifier of the data.

The wireless access device analyzes the data after receiving the data transmitted by the UE. In a possible implementation, if the data includes the second indication information and the second indication information is configured to indicate that the packet header of the data includes the second QoS flow identifier, the wireless access device analyzes the length of the second QoS flow identifier included in the packet header of the data and analyzes the corresponding second QoS flow identifier from the packet header of the data based on the length.

For example, if the length is 2 bits, the wireless access device analyzes the second QoS flow identifier of the length of 2 bits from the packet header of the data.

Further, the wireless access device can, after analyzing and obtaining the second QoS flow identifier, determine the corresponding first QoS flow identifier from the stored configuration information in accordance with the second QoS flow identifier. During actual implementation, the configuration information may include a plurality of configuration lists. Since the wireless access device can sense the data bearer that transmits the data, the wireless access device can acquire the configuration list that the data bearer corresponds to from the plurality configuration lists included in the stored configuration information, and determine the first QoS flow identifier that the second QoS flow identifier corresponds to from the correspondence relationship among the first QoS flow identifier, the second QoS flow identifier and the length of the second QoS flow identifier stored in the configuration list.

For example, referring to Table 1, if the wireless access device receives the data from the data bearer DRB1 and the second QoS flow identifier is QoS flow short ID2, the wireless access device can determine that the first QoS flow identifier is QoS flow ID2 based on the configuration list.

Further, the wireless access device can determine a transmission channel that the first QoS flow identifier corresponds to from a pre-configured correspondence relationship between the first QoS flow identifier and the transmission channel after determining the first QoS flow identifier, and can transmit the data to a core network device at the upper stratum via the determined transmission channel.

Further, the configuration information further includes first indication information for indicating a specified QoS flow that needs no transmission of the first QoS flow identifier and/or the second QoS flow identifier. The specified QoS flow includes a specified uplink QoS flow and/or a specified downlink QoS flow.

In an actual application scenario, some QoS flows need no transmission of the first QoS flow identifier or the second QoS flow identifier. For example, if only one QoS flow is mapped into the data bearer, the wireless access device can still learn about the QoS flow of the data in accordance with a radio data bearer that transmits the data even if no transmission of the first QoS flow identifier and/or the second QoS flow identifier is performed during data transmission.

In addition, the specified QoS flow may be uplink data, or downlink data, or the uplink data and the downlink data. That is, the wireless access device generally indicates the UE which uplink QoS flows need no transmission of the first QoS flow identifier and/or the second QoS flow identifier, or which downlink QoS flows need no transmission of the first QoS flow identifier and/or the second QoS flow identifier, or which uplink QoS flows and downlink QoS flows need no transmission of the first QoS flow identifier and/or the second QoS flow identifier.

In some aspects of the present disclosure, during data transmission, the corresponding second QoS flow identifier and the length of the second QoS flow identifier are queried from the stored configuration information in accordance with the first QoS flow identifier of the data to be transmitted. When the second QoS flow identifier and the length thereof are queried, it indicates that the second QoS flow identifier can replace the first QoS flow identifier. Thus, the second QoS flow identifier of the length is added into the packet header of the data. Since the length of the second QoS flow identifier is smaller than that of the first QoS flow identifier, the overhead can be reduced when information transmission is implemented based on the data added with the second QoS flow identifier. Besides, the configuration information further indicates the length of the second QoS flow identifier. Thus, the flexibility in configuring the second QoS flow identifier is improved. Therefore, the flexibility of information transmission is improved.

It should be noted that the above descriptions only take an example where the UE queries the second QoS flow identifier in accordance with the first QoS flow identifier of the data to be transmitted during data transmission and adds the second QoS flow identifier into the packet header of the data when the second QoS flow identifier is queried for illustration. The wireless access device can also transmit information in the above implementation method when transmitting data to the UE.

In general, for the downlink data, if the QoS flow is not configured with a specified parameter, the wireless access device does not add the first QoS flow identifier or the second QoS flow identifier into the packet header of the transmitted data. Here, the specified parameter is configured to indicate that the uplink data and downlink data that the QoS flow corresponds to is mapped onto the same data bearer. For example, the specified parameter may be a reflective QoS.

However, if a certain QoS flow is configured with a corresponding specified parameter, for example, reflective QoS, the wireless access device generally adds the QoS flow identifier into the downlink data, such that the UE can determine the QoS flows that adopt data bearers same as those adopted by the downlink data, as well as the adopted data bearer, to implement data transmission.

During actual implementation, the wireless access device can also query whether the corresponding second QoS flow identifier exists or not in accordance with the first QoS flow identifier, and if yes, add the second QoS flow identifier into the packet header of the transmitted data, to transmit information to the UE via the data. The implementation process of transmitting data and transmitting information via the data by the wireless access device is not introduced in detail in the aspects of the present disclosure. For details, reference may be made to the above implementation process of transmitting data and transmitting information via the data by the UE.

It should be noted that during actual implementation, if the plurality of QoS flows mapped onto a certain data bearer are all configured with the specified parameter, for example, reflective QoS, in the data transmission process, the wireless access device may not configure one random QoS flow in the plurality of QoS flows with the corresponding first QoS flow identifier or second QoS flow identifier, but only configure other QoS flows in the plurality of QoS flows with the corresponding first QoS flow identifiers or second QoS flow identifiers. That is, during actual implementation, even if the data transmitted by the wireless access device is configured with the corresponding reflective QoS, the packet header of the data may not carry the first QoS flow identifier or the second QoS flow identifier.

Figure 4A:
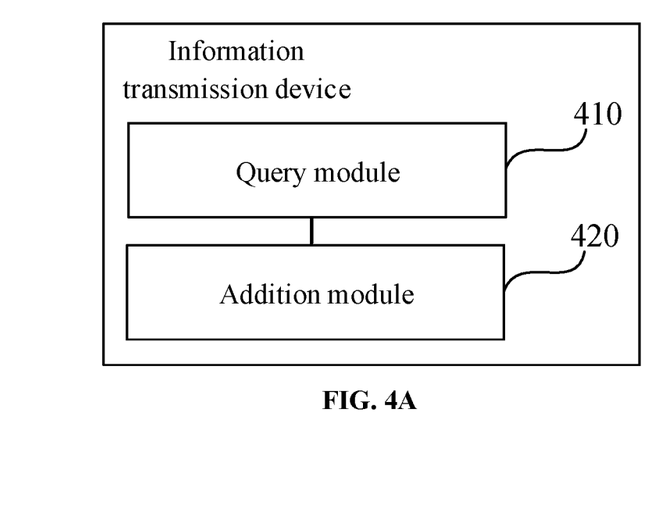
FIG. 4A is a schematic structural diagram showing an information transmission device according to some aspects.

FIG. 4A is a structural schematic diagram showing an information transmission device according to some aspects. The information transmission device includes:

a query module 410 configured to query a corresponding second QoS flow identifier and a length thereof from stored configuration information in accordance with a first QoS flow identifier of data to be transmitted. The configuration information includes a configuration list that a data bearer corresponds to. The configuration list is configured to store a correspondence relationship among the first QoS flow identifier, the second QoS flow identifier and the length of the second QoS flow identifier, and the length of the second QoS flow identifier is smaller than that of the first QoS flow identifier; and an addition module 420 configured to add the second QoS flow identifier of the length into a packet header of the data and implement information transmission based on the data obtained after addition when the query module 410 locates the second QoS flow identifier and the length thereof.

Optionally, the configuration information further includes first indication information for indicating a specified QoS flow that needs no transmission of the first QoS flow identifier and/or the second QoS flow identifier. The specified QoS flow includes a specified uplink QoS flow and/or a specified downlink QoS flow.

Optionally, the packet header of the data further includes second indication information for indicating whether the packet header of the data includes the first QoS flow identifier or the second QoS flow identifier.

Optionally, the packet header of the data further includes third indication information for indicating a length of the content of a specified field in the packet header of the data. The specified field is configured to carry the first QoS flow identifier or the second QoS flow identifier.

Optionally, when the packet header of the data includes the second QoS flow identifier, the packet header of the data further includes fourth indication information. The fourth indication information is configured to indicate the length of the second QoS flow identifier.

Figure 4B:
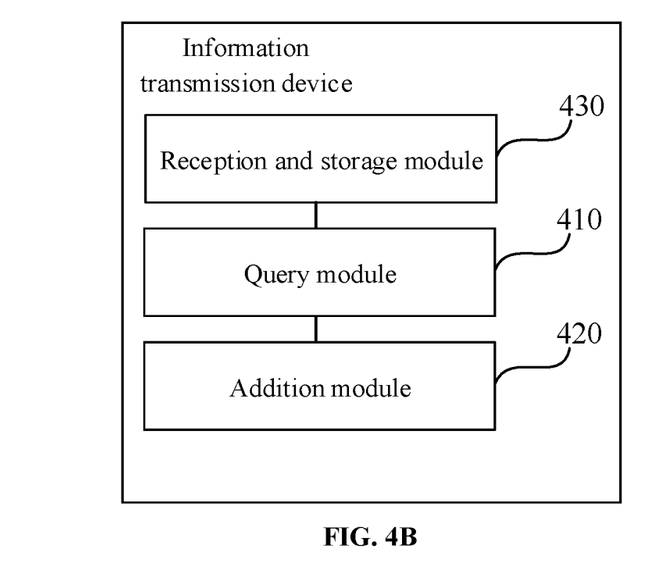
FIG. 4B is a schematic structural diagram showing an information transmission device according to some other aspects.

Optionally, referring to FIG. 4B, the information transmission device further includes:

a reception and storage module 430 configured to receive and store the configuration information transmitted by a wireless access device.

In some aspects of the present disclosure, during data transmission, the corresponding second QoS flow identifier and the length of the second QoS flow identifier are queried from the stored configuration information in accordance with the first QoS flow identifier of the data to be transmitted. When the second QoS flow identifier and the length thereof are queried, it indicates that the second QoS flow identifier can replace the first QoS flow identifier. Thus, the second QoS flow identifier of the length is added into the packet header of the data. Since the length of the second QoS flow identifier is smaller than that of the first QoS flow identifier, the overhead can be reduced when information transmission is implemented based on the data added with the second QoS flow identifier. Besides, the configuration information further indicates the length of the second QoS flow identifier. Thus, the flexibility in configuring the second QoS flow identifier is improved. Therefore, the flexibility of information transmission is improved.

With respect to the devices in the above aspects, the specific manners of performing operations of each module have been described in some aspects of the related methods, and details are not described repeatedly herein.

Figure 5:
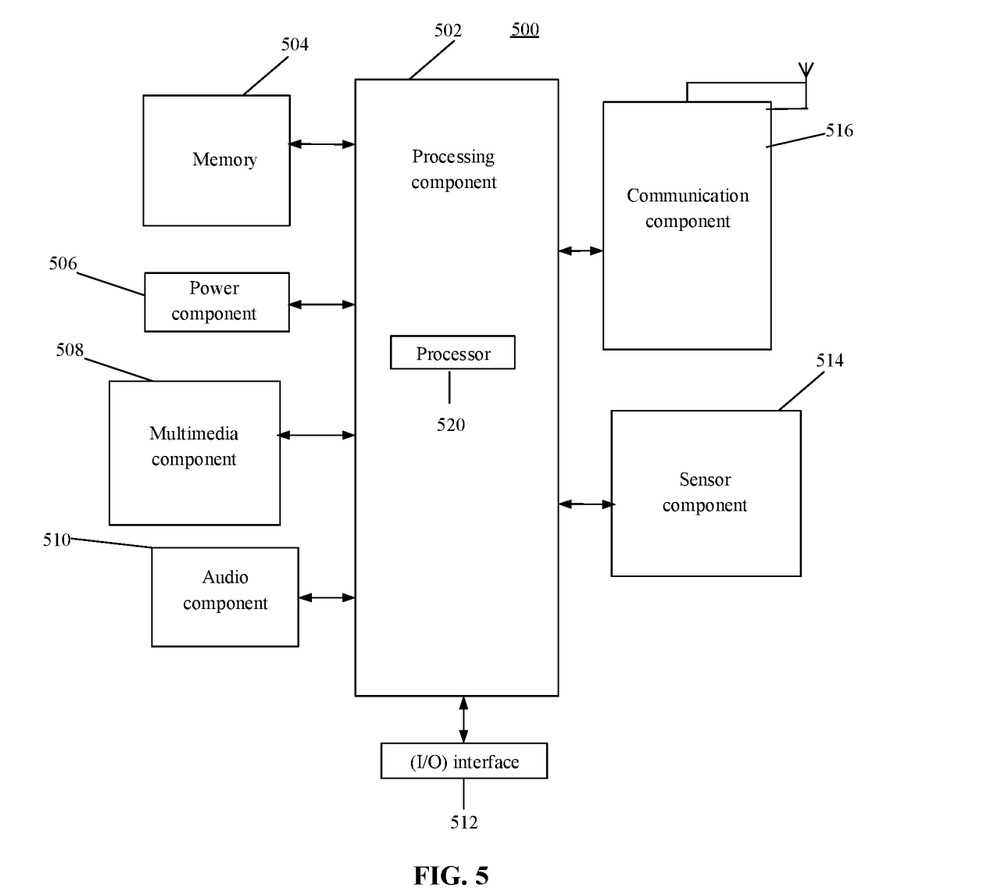
FIG. 5 is a block diagram showing an information transmission device 500 according to some aspects.

FIG. 5 is a block diagram showing an information transmission device 500 according to some aspects. For example, the information transmission device 500 may be a mobile phone, a computer, a digital broadcast terminal, a message transceiver device, a game console, a tablet device, medical equipment, fitness equipment, a personal digital assistant or the like.

In some aspects, there is provided a device for transmitting information, including: a processor; and a memory configured to store instructions executable by the processor; where the processor is configured to: query a corresponding second QoS flow identifier and a length of the second QoS flow identifier from stored configuration information in accordance with a first QoS flow identifier of data to be transmitted, the configuration information including a configuration list corresponding to a data bearer, the configuration list being configured to store a correspondence relationship among the first QoS flow identifier, the second QoS flow identifier and the length of the second QoS flow identifier, where the length of the second QoS flow identifier is smaller than a length of the first QoS flow identifier; and add the second QoS flow identifier into a packet header of the data and implement information transmission based on data obtained after addition when the second QoS flow identifier and the length of the second QoS flow identifier are received based on the query.

Referring to FIG. 5, the information transmission device 500 may include one or more following components: a processing component 502, a memory 504, a power component 506, a multimedia component 508, an audio component 510, an Input/Output (I/O) interface 512, a sensor component 514 and a communication component 516.

The processing component 502 generally controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some aspects, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some aspects, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the information transmission device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the information transmission device 500. The sensor component 514 may include a proximity sensor configured to detect the presence of nearby objects without any physical contact. The sensor component 514 may also include a light sensor, such as a CMOS or CCD image sensor, for use in imaging applications. In some aspects, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one aspect, the communication component 516 receives a broadcast signal or broadcast associated information from an external broadcast management system via a broadcast channel.

In some aspects, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the information transmission method described in the aspects of FIG. 2 or FIG. 3.

In some other aspects, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium is provided. When the instructions in the storage medium are executed by a processor of a mobile terminal, the mobile terminal is enabled to perform the above described information transmission method. The method includes following steps.

A corresponding second QoS flow identifier and a length thereof are queried from stored configuration information in accordance with a first QoS flow identifier of data to be transmitted. The configuration information includes a configuration list that a data bearer corresponds to. The configuration list is configured to store a correspondence relationship among the first QoS flow identifier, the second QoS flow identifier and the length of the second QoS flow identifier, and the length of the second QoS flow identifier is smaller than that of the first QoS flow identifier.

When the second QoS flow identifier and the length are queried, the second QoS flow identifier of the length is added into a packet header of the data and information transmission is implemented based on the data obtained after addition.

Optionally, the configuration information further includes first indication information for indicating a specified QoS flow that needs no transmission of the first QoS flow identifier and/or the second QoS flow identifier. The specified QoS flow includes a specified uplink QoS flow and/or a specified downlink QoS flow.

Optionally, the packet header of the data further includes second indication information for indicating whether the packet header of the data includes the first QoS flow identifier or the second QoS flow identifier.

Optionally, the packet header of the data further includes third indication information for indicating a length of the content of a specified field in the packet header of the data.

The specified field is configured to carry the first QoS flow identifier or the second QoS flow identifier.

Optionally, when the packet header of the data includes the second QoS flow identifier, the packet header of the data further includes fourth indication information. The fourth indication information is configured to indicate the length of the second QoS flow identifier.

Optionally, before querying the corresponding second QoS flow identifier and the length thereof from the stored configuration information in accordance with the first QoS flow identifier of the data to be transmitted, the information transmission method further includes: receiving and storing the configuration information sent by a wireless access device.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The technical solutions provided in the aspects of the present disclosure have the following beneficial effects.

In the aspects of the present disclosure, during data transmission, the corresponding second QoS flow identifier and the length thereof are queried from the stored configuration information in accordance with the first QoS flow identifier of the data to be transmitted. When the second QoS flow identifier and the length thereof are queried, it indicates that the second QoS flow identifier can replace the first QoS flow identifier. Thus, the second QoS flow identifier of the length is added into the packet header of the data. Since the length of the second QoS flow identifier is smaller than that of the first QoS flow identifier, the overhead can be reduced when information transmission is implemented based on the data added with the second QoS flow identifier. Besides, the configuration information further indicates the length of the second QoS flow identifier, such that the flexibility in configuring the second QoS flow identifier is improved, thereby improving the flexibility of information transmission.

Other aspects of the present disclosure will be apparent to those skilled in the art from consideration of the specification and practice of the present disclosure. This application is intended to cover any variations, uses, or adaptations of the disclosure following the general principles thereof and including such departures from the present disclosure as come within known or customary practice in the art. It is intended that the specification and examples be considered as only.

It should be appreciated that the present disclosure is not limited to the exact construction that has been described above and illustrated in the accompanying drawings, and that various modifications and changes can be made without departing from the scope thereof.

What is claimed is:

1. A method for transmitting information, comprising:
    based on a first Quality of Service (QoS) flow identifier of data to be transmitted, querying a corresponding second QoS flow identifier and a length of the second QoS flow identifier from stored configuration information, the configuration information comprising a configuration list corresponding to a data bearer, the configuration list being configured to store a correspondence relationship among the first QoS flow identifier, the second QoS flow identifier and the length of the second QoS flow identifier, wherein the length of the second QoS flow identifier is smaller than a length of the first QoS flow identifier; and
    adding the second QoS flow identifier into a packet header of the data and implementing information transmission based on data obtained after addition when the second QoS flow identifier and the length of the second QoS flow identifier are queried.

2. The method according to claim 1, wherein the configuration information further comprises first indication information for indicating a specified QoS flow that needs no transmission of the first QoS flow identifier and/or the second QoS flow identifier, the specified QoS flow comprising a specified uplink QoS flow and/or a specified downlink QoS flow.

3. The method according to claim 1, wherein the packet header of the data further comprises second indication information for indicating whether the packet header of the data comprises the first QoS flow identifier or the second QoS flow identifier.

4. The method according to claim 1, wherein the packet header of the data further comprises third indication information for indicating a length of content of a specified field in the packet header of the data, the specified field being configured to carry the first QoS flow identifier or the second QoS flow identifier.

5. The method according to claim 1, wherein the packet header of the data further comprises fourth indication information when the packet header of the data comprises the second QoS flow identifier, the fourth indication information being configured to indicate the length of the second QoS flow identifier.

6. The method according to claim 1, wherein prior to querying the corresponding second QoS flow identifier and the length of the second QoS flow identifier from the stored configuration information in accordance with the first QoS flow identifier of the data to be transmitted, the method further comprises:
    receiving and storing the configuration information transmitted by a wireless access device.

7. The method according to claim 1, wherein the second QoS flow identifier is configured to identify a same QoS flow that is identified by the first QoS flow identifier.

8. A device for transmitting information, comprising:
    a processor; and
    a memory configured to store instructions executable by the processor;
    wherein the processor is configured to:
    based on a first Quality of Service (QoS) flow identifier of data to be transmitted, query a corresponding second QoS flow identifier and a length of the second QoS flow identifier from stored configuration information, the configuration information comprising a configuration list corresponding to a data bearer, the configuration list being configured to store a correspondence relationship among the first QoS flow identifier, the second QoS flow identifier and the length of the second QoS flow identifier, wherein the length of the second QoS flow identifier is smaller than a length of the first QoS flow identifier; and add the second QoS flow identifier into a packet header of the data and implement information transmission based on data obtained after addition when the second QoS flow identifier and the length of the second QoS flow identifier are queried.

9. The device according to claim 8, wherein the configuration information further comprises first indication information for indicating a specified QoS flow that needs no transmission of the first QoS flow identifier and/or the second QoS flow identifier, the specified QoS flow comprising a specified uplink QoS flow and/or a specified downlink QoS flow.

10. The device according to claim 8, wherein the packet header of the data further comprises second indication information for indicating whether the packet header of the data comprises the first QoS flow identifier or the second QoS flow identifier.

11. The device according to claim 8, wherein the packet header of the data further comprises third indication information for indicating a length of content of a specified field in the packet header of the data, the specified field being configured to carry the first QoS flow identifier or the second QoS flow identifier.

12. The device according to claim 8, wherein the packet header of the data further comprises fourth indication information when the packet header of the data comprises the second QoS flow identifier, the fourth indication information being configured to indicate the length of the second QoS flow identifier.

13. The device according to claim 8, wherein prior to querying the corresponding second QoS flow identifier and the length of the second QoS flow identifier from the stored configuration information in accordance with the first QoS flow identifier of the data to be transmitted, the processor is further configured to:

receive and store the configuration information transmitted by a wireless access device.

14. The device according to claim 8, wherein the second QoS flow identifier is configured to identify a same QoS flow that is identified by the first QoS flow identifier.

15. A non-transitory computer readable storage medium, comprising instructions stored therein, wherein, when the instructions are executed by a processor, the instructions cause the processor to implement:

based on a first Quality of Service (QoS) flow identifier of data to be transmitted, querying a corresponding second QoS flow identifier and a length of the second QoS flow identifier from stored configuration information, the configuration information comprising a configuration list corresponding to a data bearer, the configuration list being configured to store a correspondence relationship among the first QoS flow identifier, the second QoS flow identifier and the length of the second QoS flow identifier; wherein the length of the second QoS flow identifier is smaller than a length of the first QoS flow identifier; and adding the second QoS flow identifier into a packet header of the data and implementing information transmission based on data obtained after addition when the second QoS flow identifier and the length of the second QoS flow identifier are queried.

16. The non-transitory computer readable storage medium according to claim 15, wherein the configuration information further comprises first indication information for indicating a specified QoS flow that needs no transmission of the first QoS flow identifier and/or the second QoS flow identifier, the specified QoS flow comprising a specified uplink QoS flow and/or a specified downlink QoS flow.

17. The non-transitory computer readable storage medium according to claim 15, wherein the packet header of the data further comprises second indication information for indicating whether the packet header of the data comprises the first QoS flow identifier or the second QoS flow identifier.

18. The non-transitory computer readable storage medium according to claim 15, wherein the packet header of the data further comprises third indication information for indicating a length of content of a specified field in the packet header of the data, the specified field being configured to carry the first QoS flow identifier or the second QoS flow identifier.

19. The non-transitory computer readable storage medium according to claim 15, wherein the packet header of the data further comprises fourth indication information when the packet header of the data comprises the second QoS flow identifier, the fourth indication information being configured to indicate the length of the second QoS flow identifier.

20. The non-transitory computer readable storage medium according to claim 15, wherein prior to querying the corresponding second QoS flow identifier and the length of the second QoS flow identifier from the stored configuration information in accordance with the first QoS flow identifier of the data to be transmitted, the instructions further cause the processor to implement:

receiving and storing the configuration information transmitted by a wireless access device.

* * * * *